United States Patent
Wills (10) Patent No.: US 6,944,760 B2
(45) Date of Patent: Sep. 13, 2005

(54) METHOD AND APPARATUS FOR PROTECTING IDENTITIES OF MOBILE DEVICES ON A WIRELESS NETWORK

(75) Inventor: Fergus M. Wills, Belfast (IE)

(73) Assignee: Openwave Systems Inc., Redwood City, CA (US)

( * ) Notice: Subject to any disclaimer, the term of this patent is extended or adjusted under 35 U.S.C. 154(b) by 860 days.

(21) Appl. No.: 09/866,037

(22) Filed: May 24, 2001

(65) Prior Publication Data

US 2002/0191795 A1 Dec. 19, 2002

(51) Int. Cl.$^7$ .............................. H04L 9/00; H04L 9/32
(52) U.S. Cl. ...................... 713/153; 713/201; 370/352; 375/220
(58) Field of Search ................................ 713/151, 201; 370/352; 375/220

(56) References Cited

U.S. PATENT DOCUMENTS

| 6,253,326 | B1 | * | 6/2001 | Lincke et al. | ............... | 713/201 |
| 6,795,924 | B1 | * | 9/2004 | Kiessling et al. | ........... | 713/201 |
| 2001/0036224 | A1 | * | 11/2001 | Demello et al. | ............. | 375/220 |
| 2001/0047474 | A1 | * | 11/2001 | Takagi et al. | ............... | 713/151 |
| 2002/0186683 | A1 | * | 12/2002 | Buck et al. | .................. | 370/352 |

FOREIGN PATENT DOCUMENTS

EP          1 081 916 A2       3/2001

OTHER PUBLICATIONS

Freedom Internet Privacy Suite 2.0, pp. 1–3, 2001, Zero-Knowledge Systems, Inc., downloaded from http://www.freedom.net/info/index.html.

Lorrie Cranor et al., "The Platform for Privacy Preferences 1.0 (P3P1.0) Specification," pp. 1–150, Sep. 15, 2000, W3C, downloaded from http://www.w3.org/TR/2000/WD-P3P-20000915/.

Eran Gabber et al., "How to Make Personalized Web Browsing Simple, Secure and Anonymous," Financial Cryptography International Conference, pp. 17–31, 1997, XP–001011338.

Stefan G. Hild et al., "Mobilizing Applications," IEEE Personal Communications, IEEE Communications Society, vol. 4, No. 5, pp. 26–34, Oct. 1997, XP 000721303.

* cited by examiner

*Primary Examiner*—Gilberto Barron, Jr.
*Assistant Examiner*—A. Nobahar
(74) *Attorney, Agent, or Firm*—Blakely, Sokoloff, Taylor & Zafman LLP (57) ABSTRACT

A method and apparatus for protecting the identities of mobile devices on a wireless network are described. A proxy gateway couples the wireless network to a wired network and maintains data associating a set of service initiators with a set of cryptographic keys. Upon receiving a request from a mobile client device directed to an origin server on the wired network, the proxy gateway identifies the cryptographic key for that origin server and sends to the origin server a proxy request. The proxy request includes an identifier of the mobile device, encrypted using the cryptographic key. When the proxy gateway receives a request from a service initiator on the wired network to push information to a mobile device, it uses the cryptographic key for that service initiator to decode a client identifier in the request and thereby determine whether the request is valid.

14 Claims, 7 Drawing Sheets

FIG. 7

METHOD AND APPARATUS FOR PROTECTING IDENTITIES OF MOBILE DEVICES ON A WIRELESS NETWORK

FIELD OF THE INVENTION

The present invention pertains to the internetworking of computers, communication devices, and other processing systems. More particularly, the present invention relates to protecting the identities of mobile devices on a wireless network having access to a wired network.

BACKGROUND OF THE INVENTION

Figure 1:
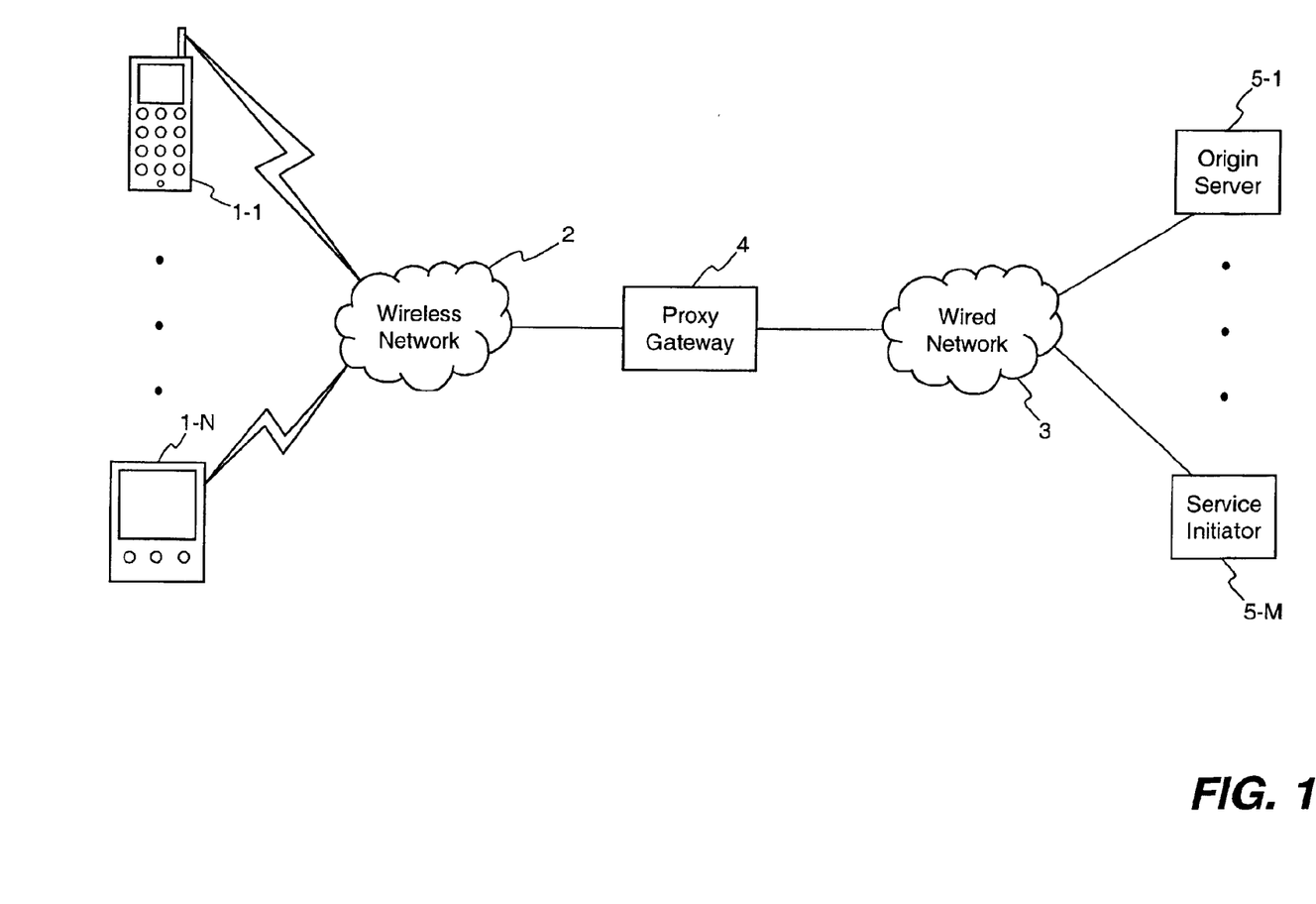
FIG. 1 illustrates a network environment in which mobile devices can communicate with origin servers and service initiators.

Present technology allows mobile devices operating on wireless networks to access information stored on a separate, wired network, such as the Internet. FIG. 1 illustrates an example of a network environment in which this may be done. A number (N) of mobile devices 1—1 through 1-N operate on a wireless network 2. Each of the mobile devices 1 may be, for example, any one of a cellular telephone, personal digital assistant (PDA), notebook (laptop) computer, two-way pager, or other wireless device. The wireless network 2 is coupled to a conventional wired computer network 3 through a proxy gateway 4. The wired network 3 may be, for example, the Internet, a corporate intranet, a wide area network (WAN), a local area network (LAN), a public switched telephone network (PSTN), or a combination thereof.

The proxy gateway 4 uses well-known techniques to enable communication between the mobile devices 1 and a number (M) of processing systems 5-1 through 5-M operating on the wired network 3. The physical computing platforms which embody the proxy gateway 4 and processing systems 5 may include, for example, conventional personal computers (PCs) and/or server-class computer systems. Among other operations, the proxy gateway 4 may convert/translate between the languages and protocols used by processing systems 5, such as hypertext markup Language (HTML) and hypertext transport protocol (HTTP), and the languages and protocols used by the mobile devices 1, such as wireless markup language (WML) and wireless access protocol (WAP). Accordingly, in one embodiment the proxy gateway 4 operates as a proxy for transmitting various requests on behalf of the mobile devices 1 and the processing devices 5, as described further below. An example of a device which can serve as the proxy gateway 4 is the UP.Link Server, from Openwave Systems of Redwood City, Calif. Note that while proxy gateway 4 is shown as a single entity, the proxy and gateway functions can be distributed between separate physical platforms. Furthermore, both functions do not necessarily have to be used in a given network environment.

Processing systems 5 include one or more "origin servers" (e.g., 5-1) and one or more "service initiators" (e.g., 5-M). Origin servers provide content, such as hypermedia documents, to mobile devices 1 in response to standard (e.g., HTTP) requests from the mobile devices 1. Service initiators "push" content to the mobile devices 1, i.e., they send content to the mobile devices 1 without the content having been explicitly requested by the mobile devices 1. Note that an origin server and a service initiator may be implemented within the same computing platform and are often implemented within a single network domain.

One problem associated with a network environment such as this is that data identifying each of the mobile devices 1 is commonly distributed to many other processing systems, such as processing systems 5 on the wired network 3. This identification data can be used for a variety of purposes, some of which are undesirable for the users of the mobile devices.

Figure 2A:
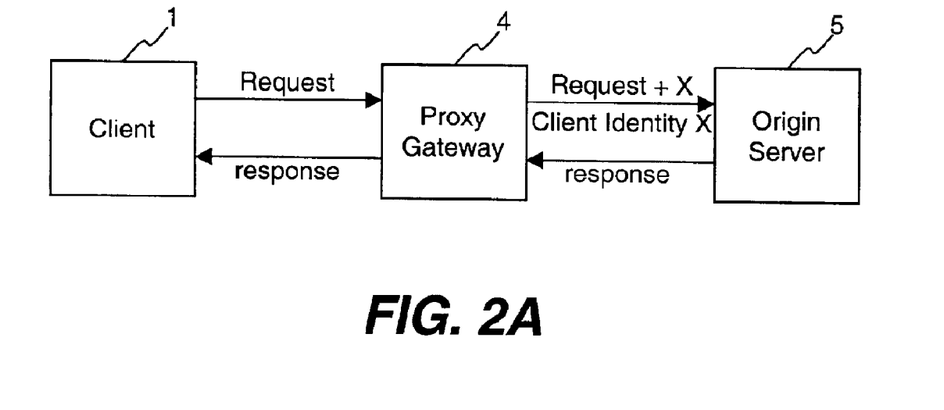
FIG. 2A shows a "pull" scenario, in which a client requests information from an origin server.

When a mobile device (a "client") makes a request for content via the proxy gateway 4, the proxy gateway 4 may add identification data to the meta-data (e.g., HTTP request headers) of that request, which is passed on to the origin server 5, as shown in FIG. 2A. This scenario is referred to as the "pull" scenario. The identification data may be a direct reference to the source address of the client (e.g., the client's mobile telephone number in the case of wireless access), or it may be the identity of the client as determined from the provisioning system controlling the proxy. The rules governing the addition of this identification data are normally controlled by a "white list" within the proxy gateway 4. The white list is a list of domain name references to which service is permitted. The client identity data may also be used as a rendezvous address for services making requests to the client, such as WAP push requests.

The client identity information may be used in a number of legitimate ways, such as: to allow devices responding to requests to authenticate the requesting mobile devices; to track the devices' requests and develop client profiles on an origin server; to tailor a response to the request and to the identity of the client; to allow access for services that make subsequent requests to the client, such as the "Posting" of documents or WAP push requests; or, to allow the client to be accessed by another communication medium, such as a short message service (SMS) message or a telephone call. Thus, the client identity passed as part of a pull request may be subsequently used in a push scenario to gain access to the client via a service proxy or gateway.

Figure 2B:
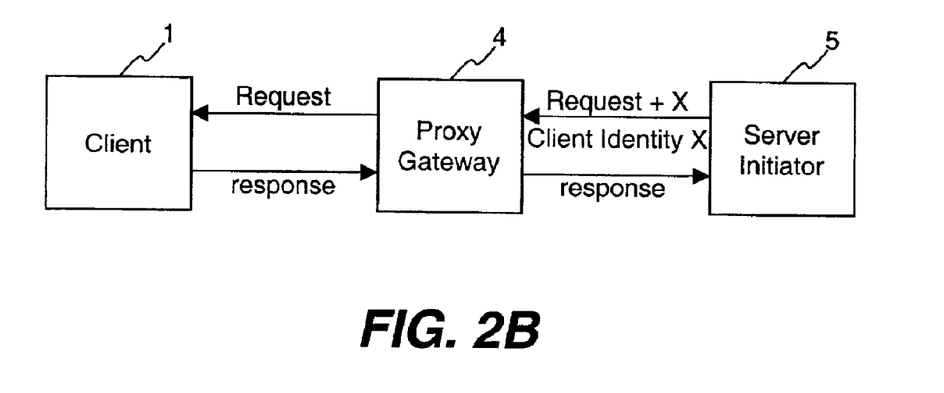
FIG. 2B shows a "push" scenario, in which a service initiator sends a requests directed to a client.

The problem is that the same identity is normally given to all servers, regardless of the intended use of the service. As a result, the client is made vulnerable in several ways. For example, disclosure of the client identity allows unsolicited access to be made to the client, such as in the form of phone calls, SMS messages, or WAP push requests, without prior authorization being given for those services. This situation is illustrated in FIG. 2B, in which a request from a service initiator 5 includes the client identity previously acquired from the proxy gateway 4, which is used to gain access to the mobile device 1. In addition, client preferences may be gathered by groups of unrelated servers using the identity supplied by the proxy gateway. Furthermore, the client identity may not be changed for an individual proxy. Once established for a single server, the client identity is valid for all servers. Consequently, it is difficult to control misuse on an individual service provider basis without assigning a new identity to the client (which may be impossible or impractical).

One attempt at solving this privacy problem is the use of pseudonyms. The pseudonym approach works by encrypting the client information at the source. However, this technique does not account for cases in which client identity information is added by network elements along the path of the request. In addition, only a single pseudonym is in operation at any one time, such that a client identity cannot be encrypted on a per-URI (uniform resource identifier) basis. In addition, the pseudonym technique is not designed to regulate any form of push service.

Another partial solution to the privacy problem is known as Platform for Privacy Preferences Project (P3P). According to this approach, a P3P client negotiates the release of personal data with the origin server prior to completing a request. The privacy policy acceptable to the client and the privacy policy of the server are both expressed in schema defined by the P3P group within the World Wide Web Consortium (W3C). This approach, however, does not prevent a client's identity from being communicated to an origin server. In addition, as with pseudonyms, there is no way to regulate a service which may initiate a request toward the client.

What is needed, therefore, is a solution which overcomes these and other shortcomings of the prior art.

SUMMARY OF THE INVENTION

The present invention includes a method and apparatus for operating a processing system on a network. In the processing system, an identifier of a mobile device on a wireless network is encrypted, and used to validate a request from a service initiator directed to the mobile device.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for protecting the identities of mobile devices on a wireless network are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

As noted above, one problem with the prior art is that the client identity passed as part of a pull request may be subsequently used for undesirable and/or unauthorized purposes. The solution described herein protects the identities of the mobile devices to prevent that from occurring. Among other advantages, the described solution allows the regulation of unauthorized and or unsolicited push services directed to the mobile devices. Further, push services can be regulated on a per-URI basis.

The solution described herein includes hashing the client identity data on each client request on a per-URI basis. This solution may be implemented within a network environment such as shown in FIG. 1. In particular, a proxy gateway such as shown in FIG. 1 can be configured to perform the described actions. Thus, referring to FIG. 3, a proxy gateway 34 coupling a wireless network to a wired network maintains a white list, which includes data associating a set of service initiators with a set of cryptographic keys. A different unique key is assigned to each service initiator URI. Upon receiving a request directed to an origin server 5 from a mobile device 1 (the client), the proxy gateway 34 identifies the cryptographic key of the target origin server 5 and sends to that origin server 5 a proxy request on behalf of the mobile device 1. The proxy request includes an identifier of the mobile device, which the proxy gateway 34 has encrypted using the cryptographic key corresponding to the target origin server 5.

Figure 3:
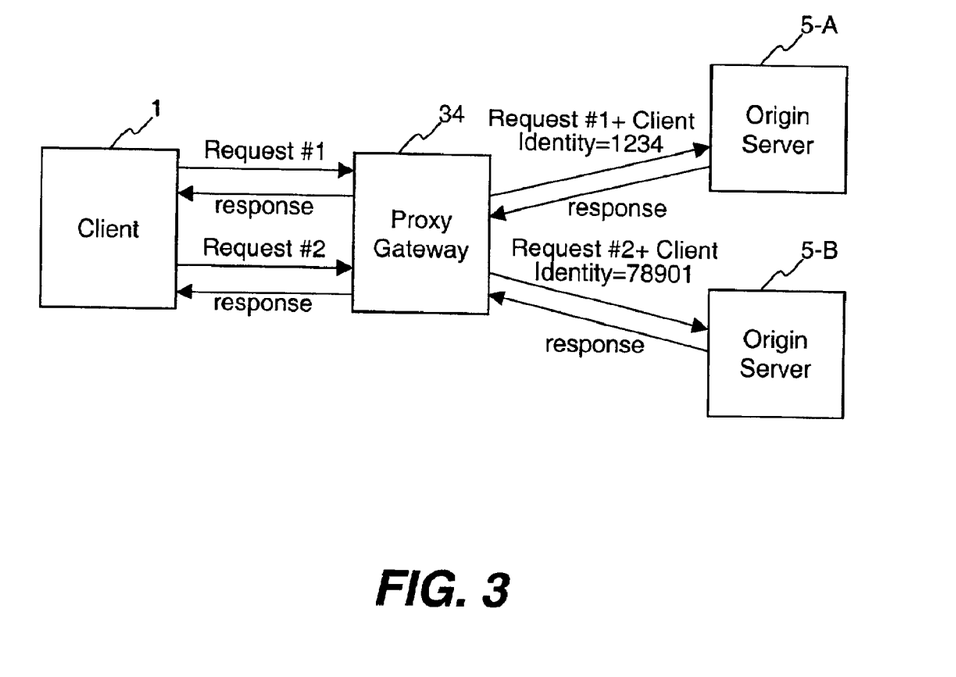
FIG. 3 is a block diagram showing the encoding of client identity within pull requests.

For example, as shown in FIG. 3, Request #1 sent by the client 1 directed to origin server 5-A is modified by the proxy gateway 34 to form a proxy request that includes the encrypted identity ("1234") of the client 1, which is then sent to origin server 5-A. For request #1, the client identity is encrypted using the key associated with origin server 5-A. Origin server 5-B has a different URI from origin server 5-A, however, and as a result, it has a different cryptographic key associated with it. Accordingly, for Request #2 the client identity is encrypted using the key associated with origin server 5-B. Consequently, Request #2 sent by the client 1 directed to origin server 5-B is modified by the proxy gateway 34 to form a proxy request to origin server 5-B, which includes an encrypted identity ("78901") of the client 1 different from that used for origin server 5-A.

Figure 4:
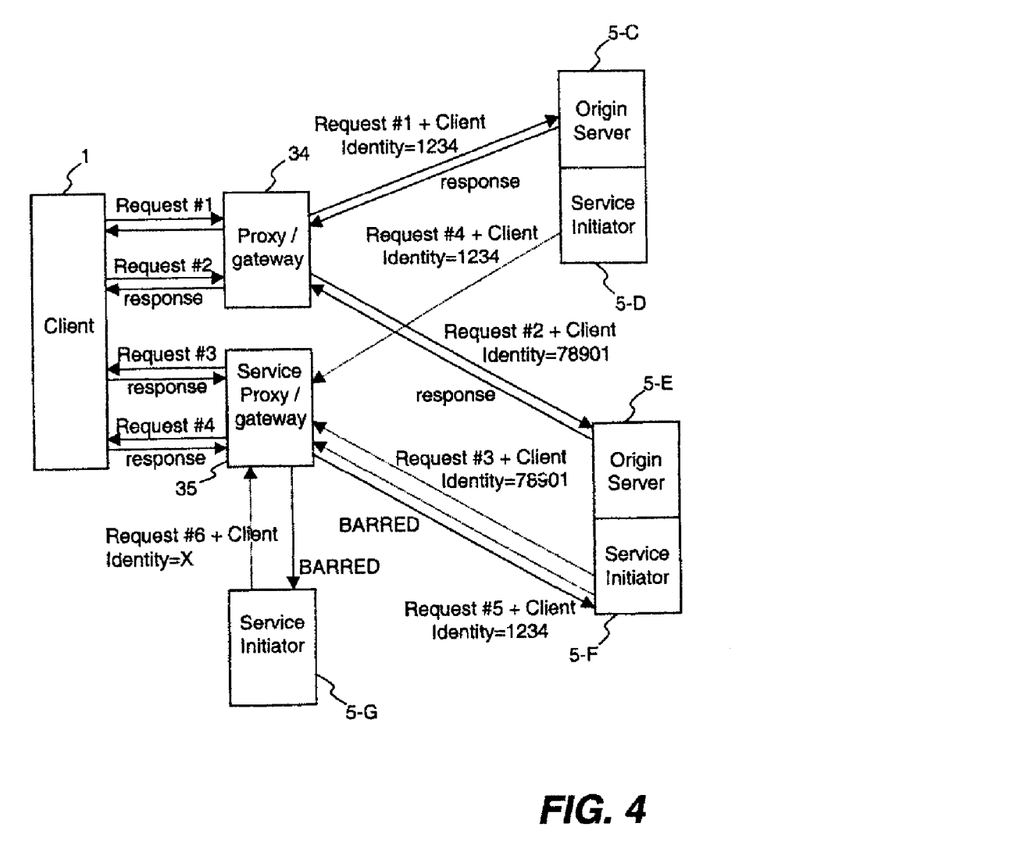
FIG. 4 is a block diagram showing the use of pull requests with different encoded client identities for different URIs, and push requests using encoded client identities.

This technique is further illustrated in FIG. 4. A service initiator and an origin server are associated together using the proxy gateway's white list, as described further below. Hence, for a given URI (which may include one or more origin servers and one or more service initiators), the proxy gateway 34 uses a unique cryptographic key to encrypt the client identifier for all pull requests directed to that URI, and the service proxy gateway 35 applies the same key to determine the validity of all push requests originating from that URI. When a service proxy gateway 35 receives a push request from a service initiator directed to a mobile device 1, it uses the cryptographic key associated with that service initiator to decode the encrypted client identity contained within the request. If the decoded client identity matches the client identity of the target mobile device 1, the request is considered the valid. Otherwise the request is considered to be invalid, and fulfillment of the request is barred.

Thus, in the push scenario, the client identity is used as the rendezvous identity for services making request to clients. Note that the true (unencrypted) client identity of each mobile device 1 may be stored in any of a number of possible locations, such as in the proxy gateway 34 and/or the service proxy gateway 35, in the mobile device 1, or elsewhere on the network. Also, note that proxy gateway 34 and the service proxy gateway 35 can be implemented within the same physical platform and may even be the same device.

Referring still to FIG. 4, consider the following example. Service initiator 5-D reuses the encrypted client identity information provided in prior pull requests to initiate a push request to the client 1 (Request #4). Service initiator 5-F does the same, except that it uses a different identity for the client 1, supplied in Request #3. Request #3 and Request #4 are valid push requests. However, when service initiator 5-F attempts to use the client identity associated with service initiator 5-D (as illustrated by Request #5), the service request is invalid and is therefore barred by the service proxy gateway 35. When a service initiator attempts to use a client identity obtained from any other source, the request is invalid and is therefore barred, as illustrated by service initiator 5-G and Request #6.

There are various types of client identifiers, derived from the mobile device, the network, or the proxy gateways, which may be encoded in this way prior to release to origin servers or service initiators. For example, the client identifier may be an international mobile subscriber identifier (IMSI), an electronic serial number (ESN), a mobile services ISDN number (MSISDN), a mobile identity number (MIN), or an Internet protocol (IP) address version 4 (IPv4) or version 6 (IPv6). Alternatively, the client identifier may be a unique alphanumeric subscriber identifier formed by using the server operator's internal account number of the subscriber, or formed by combining provisioning data, user data, and naming authority domain (e.g., "alice mag01@ csp.com").

As noted above, a service initiator and an origin server may be associated together in the proxy gateway's white list, along with the corresponding cryptographic key. An example of how such a white list may appear in a proxy gateway is set forth in the following table:

| Service Initiator URI | White List URI | Key |
|---|---|---|
| www.yahoo-push.com | www.yahoo.* Calendar.yahoo.* Messenger.yahoo.id/* My.yahoo.com/* | 123456789123456789 |
| www.icq.* | *.icq.com | 98765432112345657890 |
| www.trusted-host.com | www.mytelco.* | |

Multiple domains used in the pull environment can be linked to a single service initiator, as shown. As each pull request is made, the key hashes the subscriber number. If there is no key (i.e., the key is "0"), the client identity is transmitted to the origin server in clear text; this approach maintains backward compatibility and enables operation in a trusted manner inside the gateway operator's domain.

On receipt of a request from a service initiator, the service proxy gateway 35 will verify the domain of the service initiator against the white list. Once a valid entry has been determined, the gateway will use the key associated with the entry to decrypt the service rendezvous identity and compare it to the target client's true identity to decide whether to proceed with the request. If a decryption fails, the service initiator is informed in the response that the identifier supplied in the request was unrecognized. Note that the encrypted identity should be logged with all events generated by the proxy gateway at the same points as the clear text identity is logged for a transaction.

Figure 5:
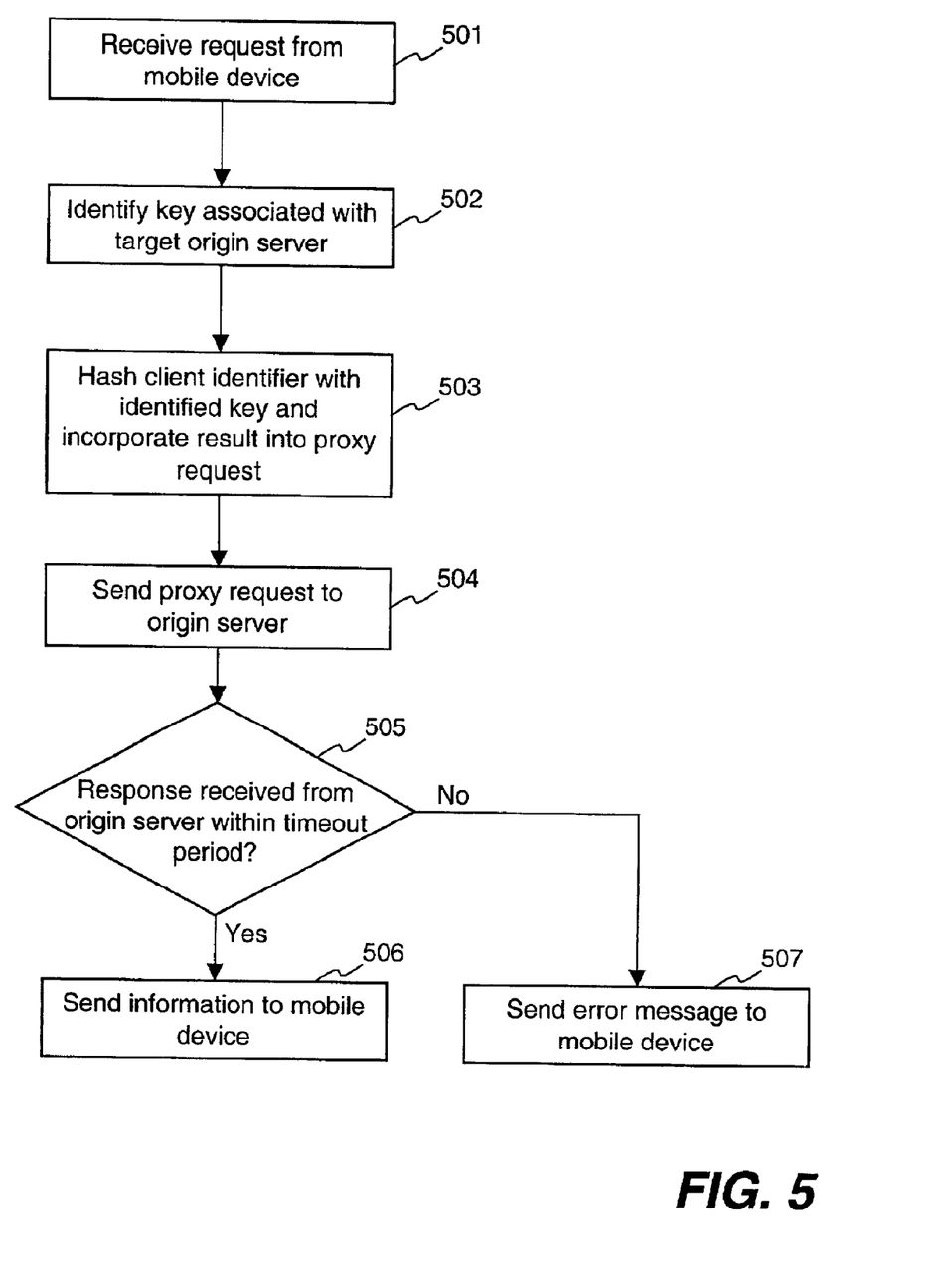
FIG. 5 is a flow diagram showing a pull process that may be performed by the proxy gateway.

FIG. 5 shows a process that may be performed by the proxy gateway 34 for the pull scenario, in accordance with the above-described technique. At block 501, the proxy gateway receives a pull request (e.g., an HTTP GET request) from a mobile device. At block 502, the proxy gateway consults its white list to identify the key associated with the origin server targeted by the request. At block 503, the proxy gateway hashes (encodes) the client identifier of the mobile device with the identified key and incorporates the encrypted result into a proxy request. At block 504, the proxy gateway sends the proxy request to the target origin server. If a response to the request is subsequently received from the origin server within a specified timeout period (block 505), the proxy gateway sends the information returned by the origin server (or other appropriate information) to the requesting mobile device at block 506. Otherwise, the proxy gateway sends an appropriate error message to mobile device at block 507.

Figure 6:
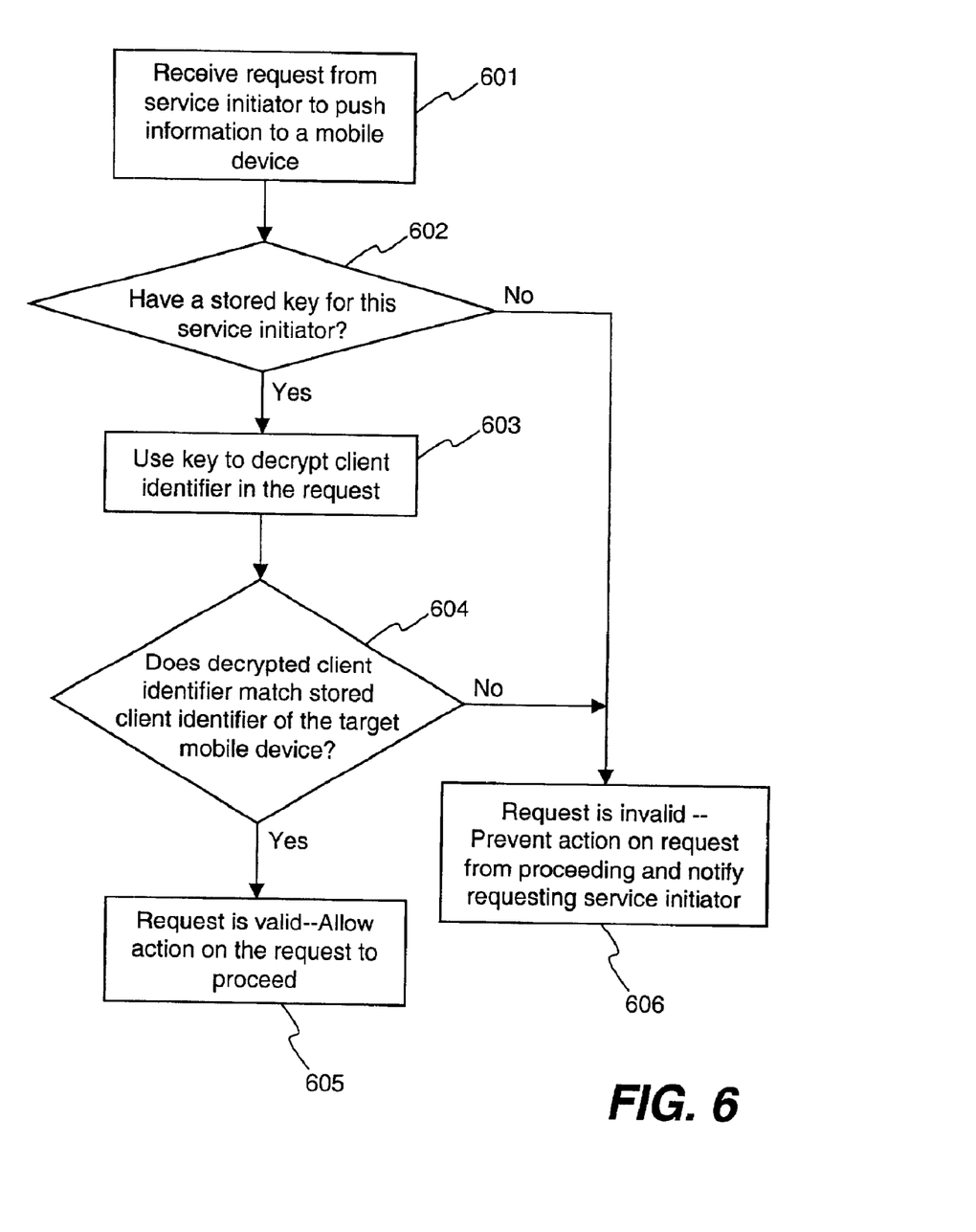
FIG. 6 is a flow diagram showing a push process that may be performed by the service proxy gateway.

FIG. 6 shows a process that may be performed by the service proxy gateway 35 for the push scenario, in accordance with the above-described technique. At block 601, the service proxy gateway receives a request from a service initiator to push information to a mobile device. The request includes a client identifier for the target mobile device, encrypted as described above. The service proxy gateway then determines at block 602 whether its white list includes a stored key for the URI of the requesting service initiator. If there is no stored key for that service initiator, then the request is determined to be invalid at block 606. In that case, action on the request is prevented, and the requesting service initiator is notified that the request has been barred. If there is a stored key for that service initiator, then at block 603 the service proxy gateway uses the key to decrypt the client identifier in the request. As noted above, this key is the same key as used to encrypt the client identity for all pull requests to origin servers having the URI of the service initiator. At block 604, the service proxy gateway determines whether the decrypted client identifier matches the true client identifier for the target mobile device. If the two client identifiers match, then the push request is determined to be invalid at block 605, and action on the request is allowed to proceed. Otherwise, the request is determined to be invalid and is therefore barred at block 606, as described above.

The hashing algorithm used to encode and decode the client identity is symmetric. That is, the same key is used for encryption and decryption for a given client and URI. A simple addition algorithm may be used. Examples of suitable algorithms include: the Kerberos authentication system, International Data Encryption Algorithm (IDEA), and Data Encryption Standard (DES). The key should be chosen to be approximately the same length has the client identity to be encrypted. Thus, IDEA and DES are examples of block cipher algorithms in which the entity being encrypted and the key material (perhaps 128 bits in length) are both divided into blocks of 16 bits (two bytes) and exclusive-OR'ed (XOR'ed) together. Two sites communicating with the same client should not be able to determine that it corresponds to the same user.

Consider the following example. Assume that a user of a mobile device, Alice, which is provisioned on a proxy gateway designated "magXYZ" in the communication service provider's domain, tries to access the URI, www.yahoo.com. Assume further that this URI has the key, 123456789123456789, or 0xACD05F15 in hexadecimal ("hex") (where the "0x" denotes hex), as assigned in the above-described white list table. The unencrypted client identifier may be, for example, Alice mag@csp.com. Hence, a standard pull request from Alice's mobile device based on HTTP version 1.1 may appear as follows:

GET http://www.yahoo.com/HTTP/1.1
Accept: application/vnd.wap.wmlc
Request proxied from MAG/EFS
GEThttp://www.yahoo.com/HTTP/1.1
Accept: application/vnd.wap.wmlc
x-u p -
subno:'0xEEBE3676098F31740BA43A661AFE307A'

The encrypted client identifier in this example is 0xEEBE3676098F31740BA43A661AFE307A, which appears after the "x-up-subno:" header in the last line of the request. The encoding breakdown for the encrypted identifier is as follows:

"Al" XOR 0xACD0=0xEEBE
"ic" XOR 0x5F15=0x3676
"e_" XOR 0xACD0=0xC98F
"ma" XOR 0x5F15=0x3174
"g@" XOR 0xACD0=0xCBA4
"cs" XOR 0x5F15=0x3A66
"p." XOR 0xACD0=0xDAFE
"co" XOR 0x5F15=0x3C7A
"m" XOR 0xACD0=0xC1

For each client identifier that is to be protected in this manner, the symmetric encoding is applied. In the push scenario, when the client identifier 0xEEBE3676098F31740BA43A661AFE307A is used as a push address, an identical XOR function is applied using the same key, 0xACD05F15, such that the original client identifier is generated. For example, 0xEEBE XOR 0xACD0 produces ASCII code "A"+ASCII code "1".

An example of such a push request based on HTTP version 1.1 is as follows:

POST/cgi-bin/wap_push.cgi HTTP/1.1
Host: www.wireless-network.com
Date: Sun, May 13, 2001 18:13:23 GMT
Content-Type:
multipart/related;boundary=asdlfkjiurwghasf;type=
 "application/xml"
Content-Length:353
—asdlfkjiurwghasf
Content-Type: application/xml
<?xml version="1.0"?>
<!DOCTYPE pap PUBLIC "-//WAPFORUM//DTD PAP
 1.0//EN"
"http://www.wapforum.org/DTD/pap_1.0.dtd">
<pap>
<push-message push-id="9feo39jf084@pi.com">
<address address-
v a l u e = " w a p p u s h =
 0xEEBE3676098F31740BA43A661AFE307A/type=
 user@
csp.com"></address>
</push-message>
</pap>
—asdlfkjiurwghasf
Content-Type: text/vnd.wap.wml
<?xml version="1.0"?>

As shown, the push identifier is the encoded client identifier. During processing by the proxy gateway, the source of the push request is looked up in the white list table, and the key is extracted and applied again to decode the identifier to the true/original subscriber identifier.

Figure 7:
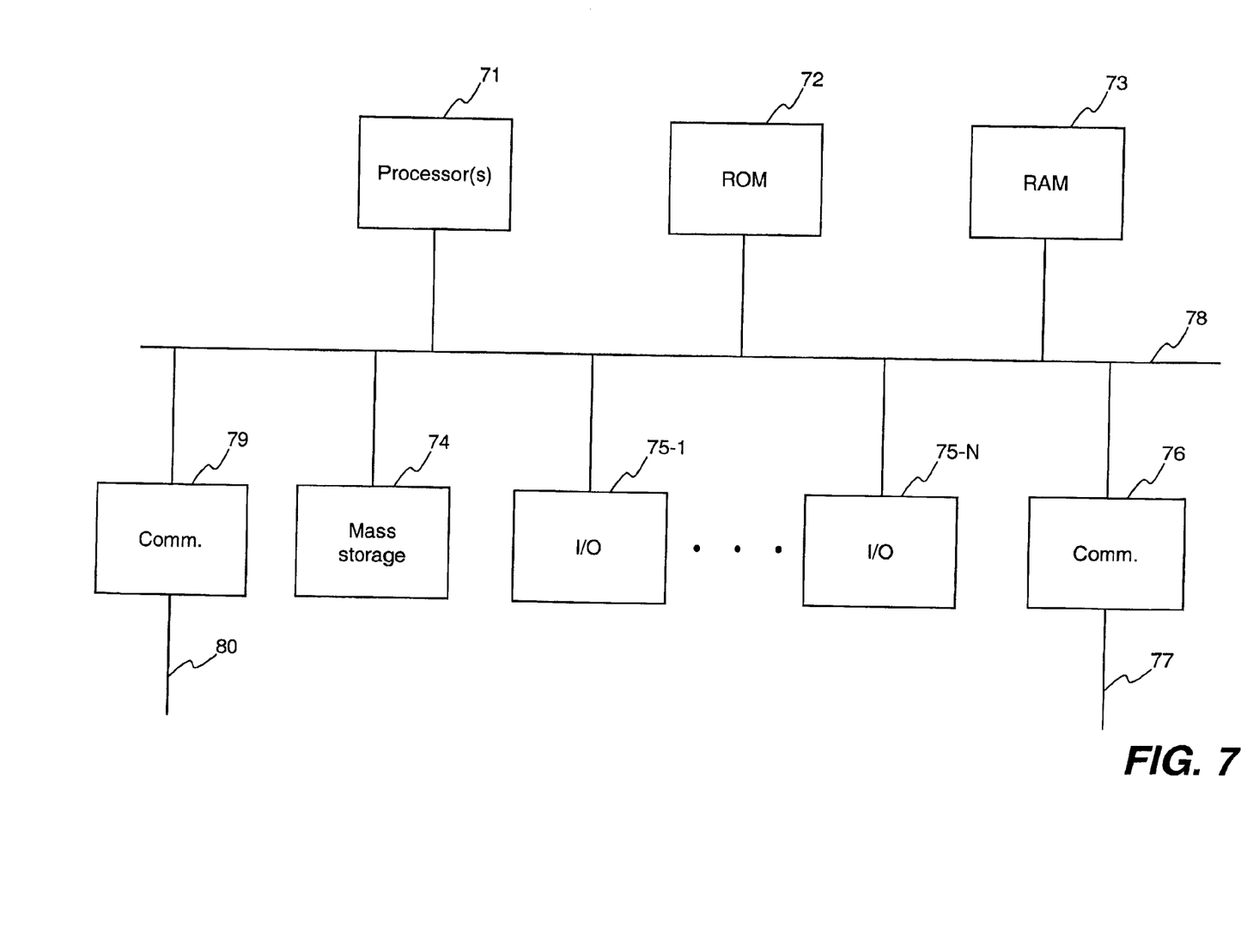
FIG. 7 is a high-level block diagram of a processing system representing any of the processing systems shown in FIG. 1.

As noted above, various types of processing systems may be used to implement the operations described herein, such as PCs, server-class computers, or (particularly in the case of mobile devices) cellular telephones, PDAs, two-way pagers, etc. FIG. 7 is a high-level block diagram of a processing system representative of any of the processing systems shown in FIG. 1. Note that FIG. 7 is not intended to represent any one specific physical arrangement of components, as such details are not germane to the present invention and are well within the knowledge of those skilled in the art.

The illustrated processing system includes one or more processors 71, i.e., a central processing unit (CPU), read-only memory (ROM) 72, random access memory (RAM) 73, and a mass storage device 74, coupled to each other on a bus system 78. The bus system 78 may include one or more buses connected to each other through various bridges, controllers and/or adapters, such as are well-known in the art. For example, the bus system 78 may include a "system bus", which may be connected through an adapter to one or more expansion buses, such as a peripheral component interconnect (PCI) bus or an extended industry standard architecture (EISA) bus. Also coupled to the bus system 78 are a mass storage device 74, one or more input/output (I/O) devices 75-1 through 75-N, and one or more data communication devices 76 and 79, to communicate with remote processing systems via one or more communication links 77 and 80, respectively. Note that a server would not necessarily require I/O devices 75 in addition to the data communication device. The I/O devices 75 could include, for example, any one or more of: a display device, a keyboard, a pointing device (e.g., mouse, trackball, or touchpad), or an audio speaker.

The processor(s) 71 may be, or may include, for example, one or more conventional general-purpose or special-purpose programmable microprocessors, digital signal processors (DSPs), application specific integrated circuits (ASICs), or programmable logic devices (PLDs), or a combination of such devices. The mass storage device 74 may be, or may include, any one or more devices suitable for storing large volumes of data in a non-volatile manner, such as a magnetic disk or tape, magneto-optical (MO) storage device, or any of various types of Digital Video Disk (DVD) or Compact Disk (CD) based storage, or a combination of such devices.

The data communication devices 76 and 79 may be any devices suitable for enabling the processing system to communicate data with a remote processing system over a data communication link, such as a wireless transceiver (e.g., if implemented in a mobile device), a conventional telephone modem, a wireless modem, an Integrated Services Digital Network (ISDN) adapter, a Digital Subscriber Line (DSL) modem, a cable modem, a satellite transceiver, an Ethernet adapter, or the like. At least one of communication links 77 and 80 may be a wireless link, such as to provide the connection between mobile devices 1 and wireless network 2 in FIG. 1.

Note that while FIG. 7 shows two communication devices 76 and 79, more than one data communication device would not necessarily be required. A proxy gateway or service proxy gateway does require at least two communication interfaces (i.e., one to connect to the wireless network and one to connect to the wired network), although these interfaces potentially can be implemented in a single physical device.

It will be recognized that many of the features and techniques described above may be implemented in software. That is, the described operations may be carried out in a processing system in response to its processor(s) executing sequences of instructions contained in memory. The instructions may be executed from a memory such as RAM 73 and may be loaded from a persistent store, such as a mass storage device 74 and/or from one or more other remote processing systems. Likewise, hardwired circuitry may be used in place of software, or in combination with software, to implement the features described herein. Thus, the present invention is not limited to any specific combination of hardware circuitry and software, nor to any particular source of software executed by the processing systems.

Thus, a method and apparatus for protecting the identities of mobile devices on a wireless network have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of operating a proxy on a network, the method comprising:

storing an association of service providers and cryptograpic keys;

receiving a request from a mobile device, the request direted to a remote server on the network;

using the stored association to identify a cryptographic key associated with the remote server;

using the identified cryptographic key to encode an Identifier of the mobile device;

incorporating the encoded identifier into a proxy request;

sending the proxy request to the remote server on behalf f the mobile device;

receiving a request from a service initiator on the network to push information to the mobile device;

determining whether the stored association includes a cryptographic key associated with the service initiator;

if the stored association includes a cryptographic key associated with the service initiator, using said cryptograhic key to decode a device identifier in the request from the service initiator;

determining whether the decoded device identifier corresponds to the mobile device; and allowing the request from the service initiator to be fulfilled only if the stored association includes a cryptographic key associated with the service initiator and the decoded device identifier corresponds to the mobile device.

2. A method as recited in claim 1, wherein said storing an association of service providers and cryptographic keys comprises storing a unique cryptographic key for each of a plurality of service providers.

3. A method as recited in claim 2, wherein the store association specifies a plurality of network addresses for at least one of the plurality of service providers, and wherein said using the stored association to identify a cryptographic key comprises identifying a cryptographic key associated with a network address to which the request is directed.

4. A method as recited in claim 1, wherein said using the identified cryptographic key to encode an identifier of the mobile device comprises hashing the cryptographic key with the identifier of the mobile device.

5. A method of operating a proxy on a network, the method comprising:

storing an association of service initiators and cryptographic keys, including a plurality of cryptographic keys and one or more network addresses associated with each of the cryptographic keys;

receiving a roquest from a service initiator on the network to push information to a mobile device;

determining whether the stored association includes a cryptographic key associated with the service initiator;

if the stored association includes a cryptographic key associated with the service initiator, using said cryptographic key to decode a device identifier in the request from the service initiator;

determining whether the decoded device identilier corresponds to the mobile device; and allowing the request from the service initiator to be fulfilled only if the stored association includes a cryptographic key associated with the service initiator and the decode device identifier corresponds to the mobile client device.

6. A method as recited in claim 5, wherein said using the identified cryptographic key to encode an identifier of the mobile device comprises hashing the cryptographic key with the identifier of the mobile device.

7. A method as recited in claim 5, further comprising:

receiving a request from the mobile device, the request directed to a network address representing a remote server on the network;

using the stored association to identify a cryptographic key associated with the remote server;

generating a proxy request based on the request received am the mobile device, by using the identifier cryptographic key associated with the remote server to encode an identifier of the mobile device and incorporating the encoded identifier into the proxy request; and sending the proxy request to the remote server on behalf of the mobile device.

8. A method of operating a proxy on a network, the method comprising:

storing an association of service initiators and cryptographic keys including a plurality of cryptographic keys and one or mare network addresses associated with each of the cryptographic keys;

receiving a request from a mobile client device, the request directed to a network address representing a remote server on the network;

using the stored association to identify a cryptographic key associated with the remote server;

generating a proxy request based on the request received from the mobile client device, by using the identified cryptographic key to encode an identifier of the mobile client device and incorporating the encoded identifier into the proxy request;

sending the proxy request to the remote server on behalf of the mobile client device;

receiving a request from a service initiator on the network to push information to the mobile client device;

determining whether the stored association includes a cryptographic key associated with the service initiator;

if the stored association includes a cryptographic key associated with the service initiator, using said cryptographic key to decode a client identifier in the request from the service initiator;

determining whether the decoded client identifier corresponds to the mobile client device; and allowing the request from the service initiator to be fulfilled only if the stored association includes a cryptographic key associated with the service initiator and the decoded client identifier corresponds to the mobile client device.

9. A method as recited in claim 8, wherein said using the identified cryptographic key to encode an identifier of the mobile client device comprises hashing the cryptographic key with the identifier of the mobile client device.

10. A method of operating a server, the method comprising:

receiving a request to provide first information to a mobile client device on a wireless network, the request including an encrypted identifier of a mobile client device;

sending the first information in response to the request, for communication to the mobile client device; and sending a request to push second information to the mobile client device by including the encrypted identifier in the request to push the second information to the client device, such that the encrypted identifier in the request to push the second information is used to validate the request to push the second information.

11. A proxy gateway connected to a wireless network and to a wired network, the proxy gateway configured to provide a plurality of mobile devices on the wireless network with access to a plurality of processing systems on the wired network, the proxy gateway comprising:

a processor; and a storage medium having stored therein instructions which configure the proxy gateway to perform the method comprising storing an association of service providers and cryptographic keys;

receiving a request from a mobile device on the wireless network, the request directed to a remote server on the wired network;

using the stored association to identify a cryptograpic key associated with the remote server;

using the identified cryptographic key to encode an identifier of the mobile device;

incorporating the encoded identifier into a proxy request;

sending the proxy request to the remote server on behalf of the mobile device:

receiving a request from a service initiator on the wired network to push information to one of the mobile devices on the wireless network;

determining whether the stored association includes cryptograghic key associated with said service initiator;

if the stored association includes a cryptographic key associated with said service initiator, using said cryptograghic key to decode device identifier in the request from said service initiator;

determining whether the decode device identifier corresponds to said one of the mobile devices, and allowing the request from the service initiator to be fulfilled only if the stored association includes a cryptographic key associated with said service initiator and the decode device identifier corresponds to said one of the mobile devices.

12. A proxy gateway as recited in claim 11, wherein said storing an association of service providers and cryptographic keys comprise storing a unique cryptographic key for each of a plurality of service providers.

13. A proxy gateway as recited in claim 12, wherein the stored association specifies a plurality of network addresses for at least one of the plurality of service providers, and wherein said using the stored association to identify a cryptographic key comprises identifying a cryptographic key associated with a network address to which the request is directed.

14. A proxy gateway as recited in claim 11, wherein sat using the identified cryptographic key to encode an identifier of the mobile device comprises hashing the cryptographic key with the identifier of the mobile device.

* * * * *